United States Patent [19]

Brown

[11] 4,055,303
[45] Oct. 25, 1977

[54] AGRICHEMICAL SPRAYING SYSTEM

[75] Inventor: Erben G. Brown, San Marcos, Calif.

[73] Assignee: Golden State Helicopter, Inc., San Marcos, Calif.

[21] Appl. No.: 655,341

[22] Filed: Feb. 5, 1976

[51] Int. Cl.² .................... B05B 1/20; B05B 17/02; B05B 7/26; B01F 7/08
[52] U.S. Cl. .................... 239/142; 137/264; 137/265; 137/625.4; 137/637; 239/164; 239/171; 239/304; 239/414
[58] Field of Search .............. 239/1, 10, 74, 142, 239/146, 148, 159, 164, 171, 172, 176, 304, 310, 414, 416.2, 417.5, 433; 137/625.4, 637, 604, 605, 608, 607, 259, 264, 265; 259/104; 244/135 C

[56] References Cited

U.S. PATENT DOCUMENTS

| 1,603,546 | 10/1926 | Kirschbraun | 259/104 X |
| 1,619,183 | 3/1927 | Bradner et al. | 239/171 X |
| 2,680,648 | 6/1954 | Price | 239/171 |
| 2,969,803 | 1/1961 | Mosher | 244/135 C |
| 3,050,083 | 8/1962 | Verway | 137/625.4 X |
| 3,216,617 | 11/1965 | Blomgren, Sr. et al. | 239/171 |
| 3,284,009 | 11/1966 | Stull et al. | 239/171 X |
| 3,499,606 | 3/1970 | Smith | 239/171 X |
| 3,822,040 | 7/1974 | Hibbard | 239/171 X |
| 3,981,321 | 9/1976 | Risse et al. | 244/135 C X |

Primary Examiner—Evon C. Blunk
Assistant Examiner—Andres Kashnikow
Attorney, Agent, or Firm—Isbell & Charmasson

[57] ABSTRACT

Disclosed are an aerial agrichemical spraying process and apparatus for producing and applying a multifluid invert emulsion. The apparatus, which is combined with an aircraft, comprises automatically balanced concentric tanks; multifluid valves combining individual preset metering control for each fluid with common, automatic, and simultaneous on/off control for all fluids; a single low-speed pump; a rotary twisted blade in-line mixer; a boom fitted with a number of spray nozzles; feeding and linking conduits; and an electrical control system.

5 Claims, 15 Drawing Figures

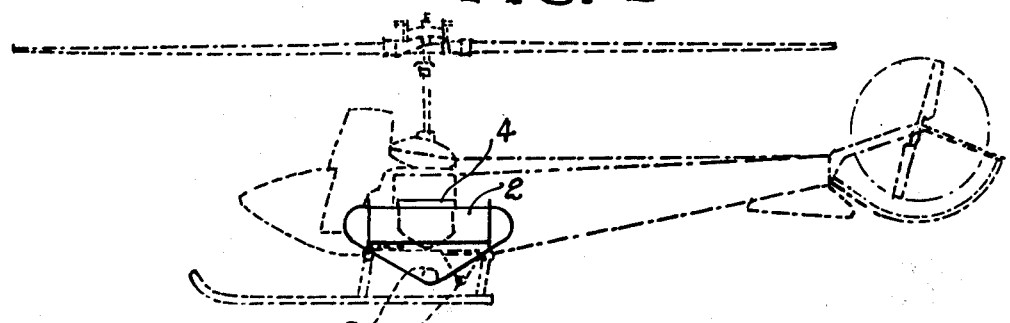
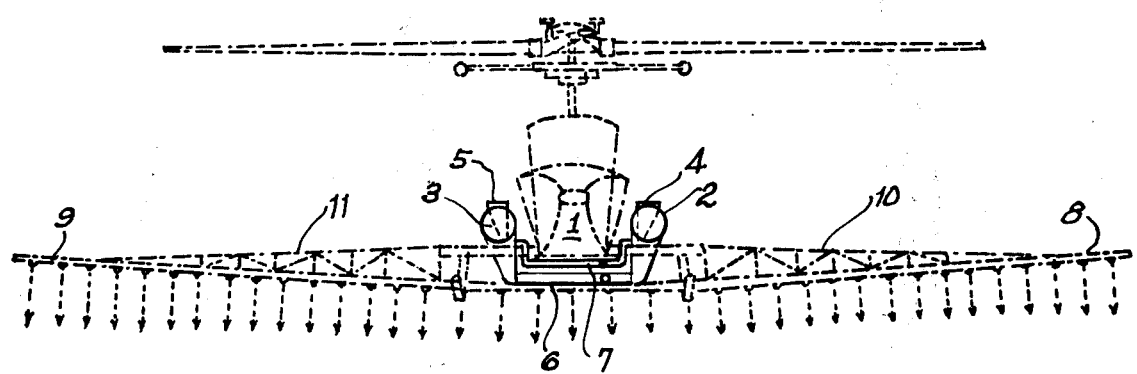
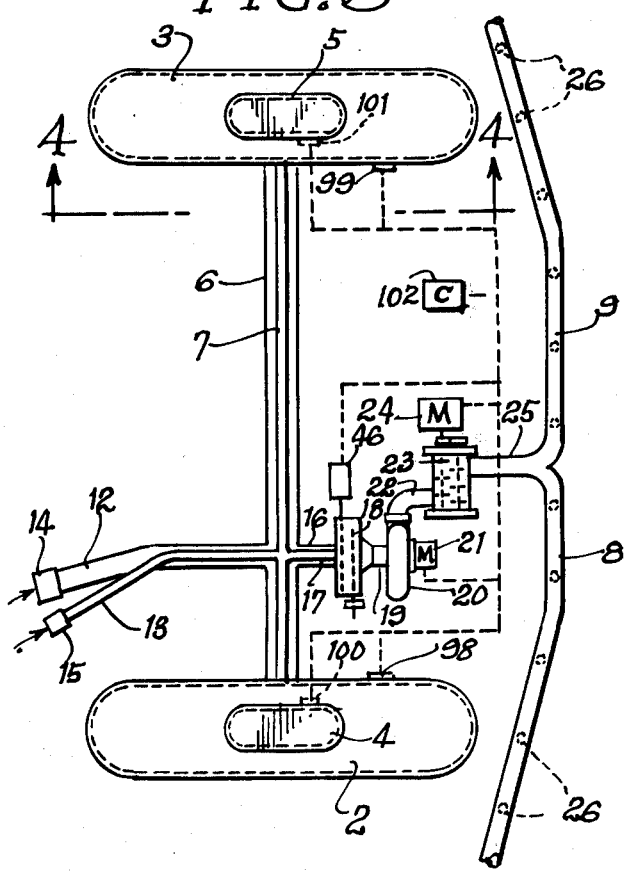
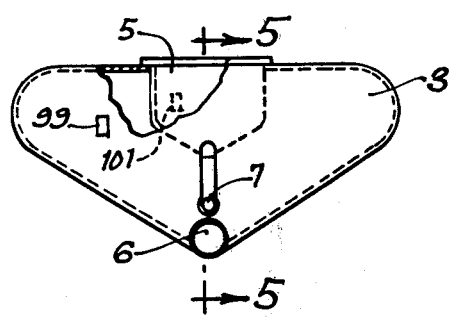
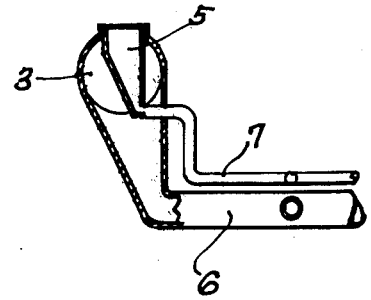

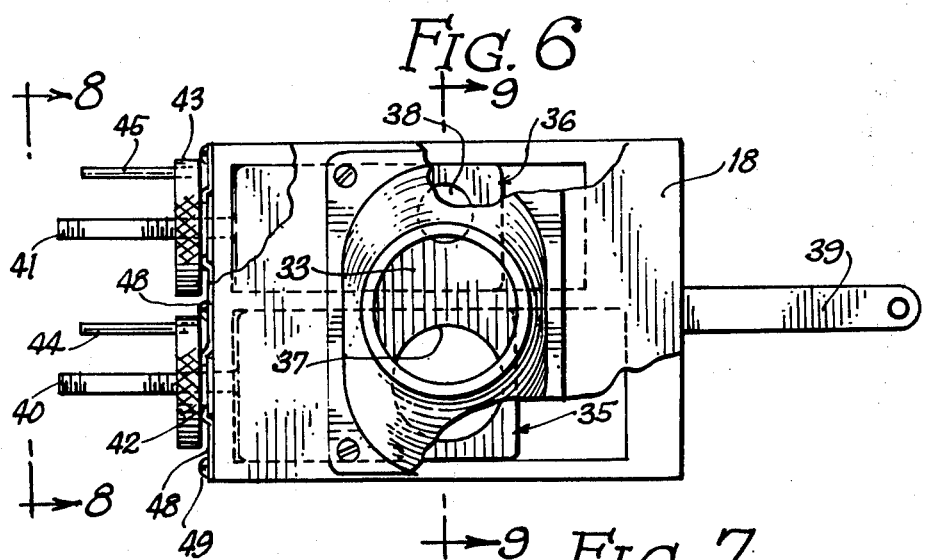
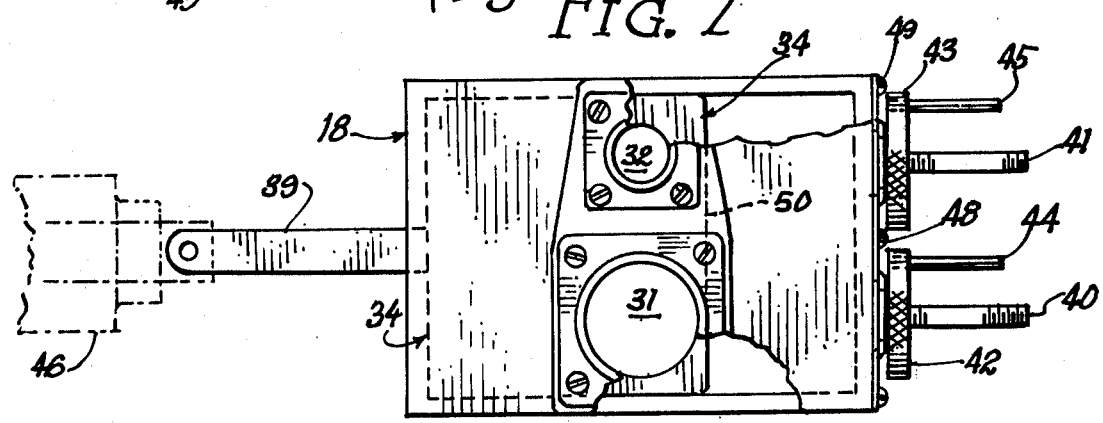
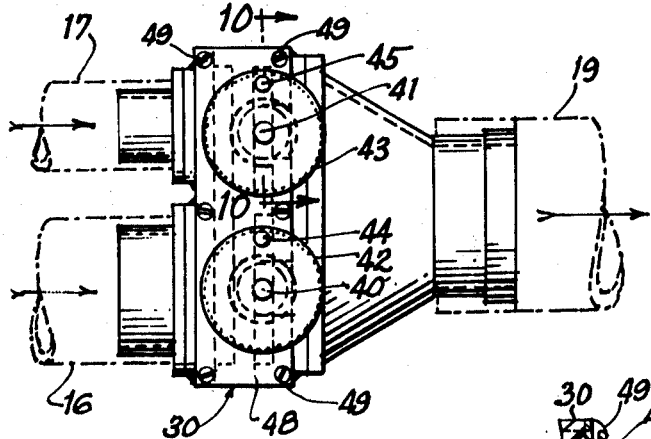
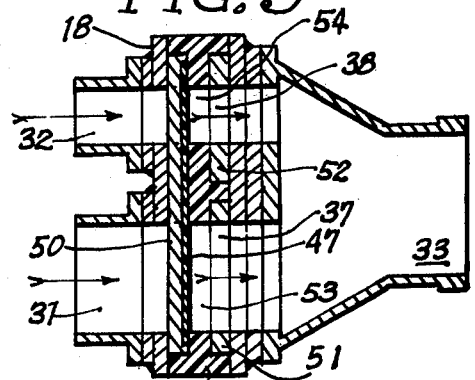
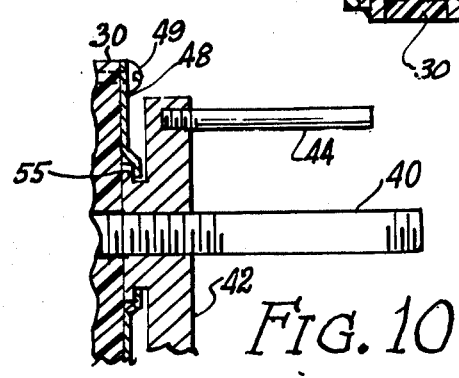

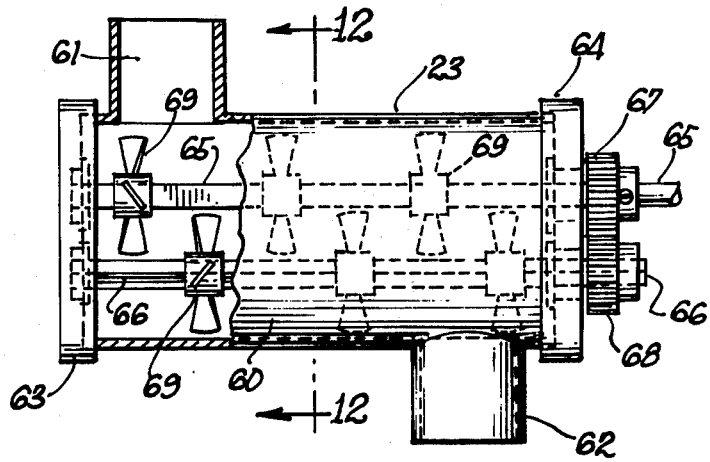
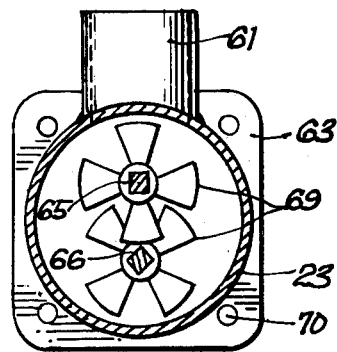
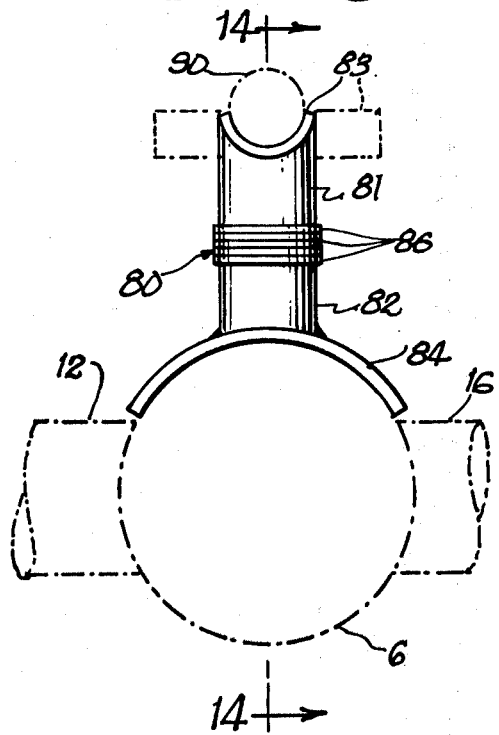
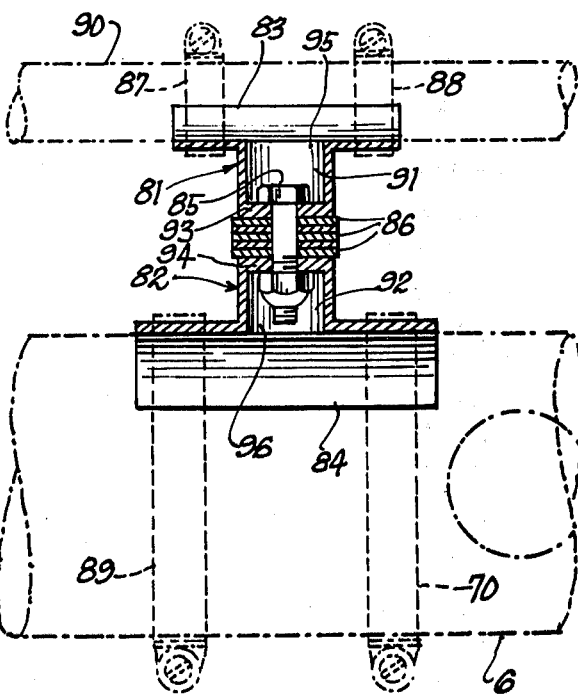

AGRICHEMICAL SPRAYING SYSTEM

BACKGROUND

This invention relates to the application of pesticides and herbicides by a spraying process, and more specifically to the in-flight formation and aerial spraying of a multifluid invert emulsion carrying a pesticidal or herbicidal agent.

The use of water-in-oil invert emulsion spray to reduce wind draft is well known to persons associated with aerial agrichemical spraying. In summary, the process involves the making and spraying of a solution consisting of a pesticidal or herbicidal agent, the aqueous and oil phases, and an effective concentration of emulsifying material that promotes the formation of a water-in-oil emulsion whereby said aqueous phase is intimately and finely dispersed in said oil phase.

Various methods and apparatuses have been previously suggested for producing and applying invert emulsions from an aircraft. None, however, have been able to sufficiently control turn-on, cut-off, dosage, and flow rate of the various components to assure uniform application of the solution containing the pesticidal or herbicidal agent. Among the numerous factors contributing to the uniform aerial application of spray over a controlled area, continuity and uniformity of flow of the invert emulsion components are extremely critical; sudden changes in the rheological properties of the invert emulsion can result in excessive drift which may cause irremediable damage to neighboring crops.

The ideal invert emulsion spraying system should produce a clean turn-on and cut-off of the spray, requiring no in-flight adjustment. Ease of operation is also essential to the operator of an airborne system, who must devote his attention to the control of his aircraft. Furthermore, the system itself must be light and have the minimum impact upon aircraft maneuverability.

SUMMARY

The present invention is designed to provide an airborne agrichemical spraying process and apparatus featuring:

- a continuous and closely metered flow of multiple component fluids into an inversion-producing mixer and uniform spraying of the resulting emulsion;
- an immediate and wasteless turn-on and cut-off of the inversion process and the spraying process;
- an automatic system shut-off when one of the fluid components has been exhausted;
- a balanced loading of the system-carrying aircraft through use of paired and concentric fluid tanks;
- rapid loading of the emulsion components;
- a multifluid dispensing system;
- a single low speed pump means; and relatively inexpensive system hardware.

DRAWINGS

FIG. 1 is a side view of a helicopter carrying the spraying apparatus;

FIG. 2 is a front view of the helicopter shown in FIG. 1.

FIG. 3 is a diagram showing the various elements of the spraying apparatus;

FIG. 4 is a side elevation of concentric fluid tanks taken from line 4—4 of FIG. 3 with partial cut-away showing part of the inner tank;

FIG. 5 is a cross-sectional view of the tanks shown in FIG. 5 taken along line 5—5;

FIG. 6 is a rear elevation of a modular valve element with partial cut-away showing the inside mechanism;

FIG. 7 is a front elevation of the valve element shown in FIG. 6 with partial cut-away showing the inside mechanism;

FIG. 8 is a side elevation of the valve element shown in FIG. 6 taken along line 8—8;

FIG. 9 is a cross-sectional view of the valve element shown in FIG. 6 taken along line 9—9;

FIG. 10 is a cross-sectional view of a thumbwheel assembly shown in FIG. 8 taken along line 10—10;

FIG. 11 is a top view of the mixer assembly;

FIG. 12 is a cross-sectional view of the mixer assembly shown in FIG. 11 taken along line 12—12;

FIG. 13 is a front elevation of a pipe suspension bracket assembly;

FIG. 14 is a side view of the pipe suspension bracket assembly shown in FIG. 13 taken along line 14—14;

DESCRIPTION OF THE PREFERRED EMBODIMENT OF THE INVENTION

Figure 15:
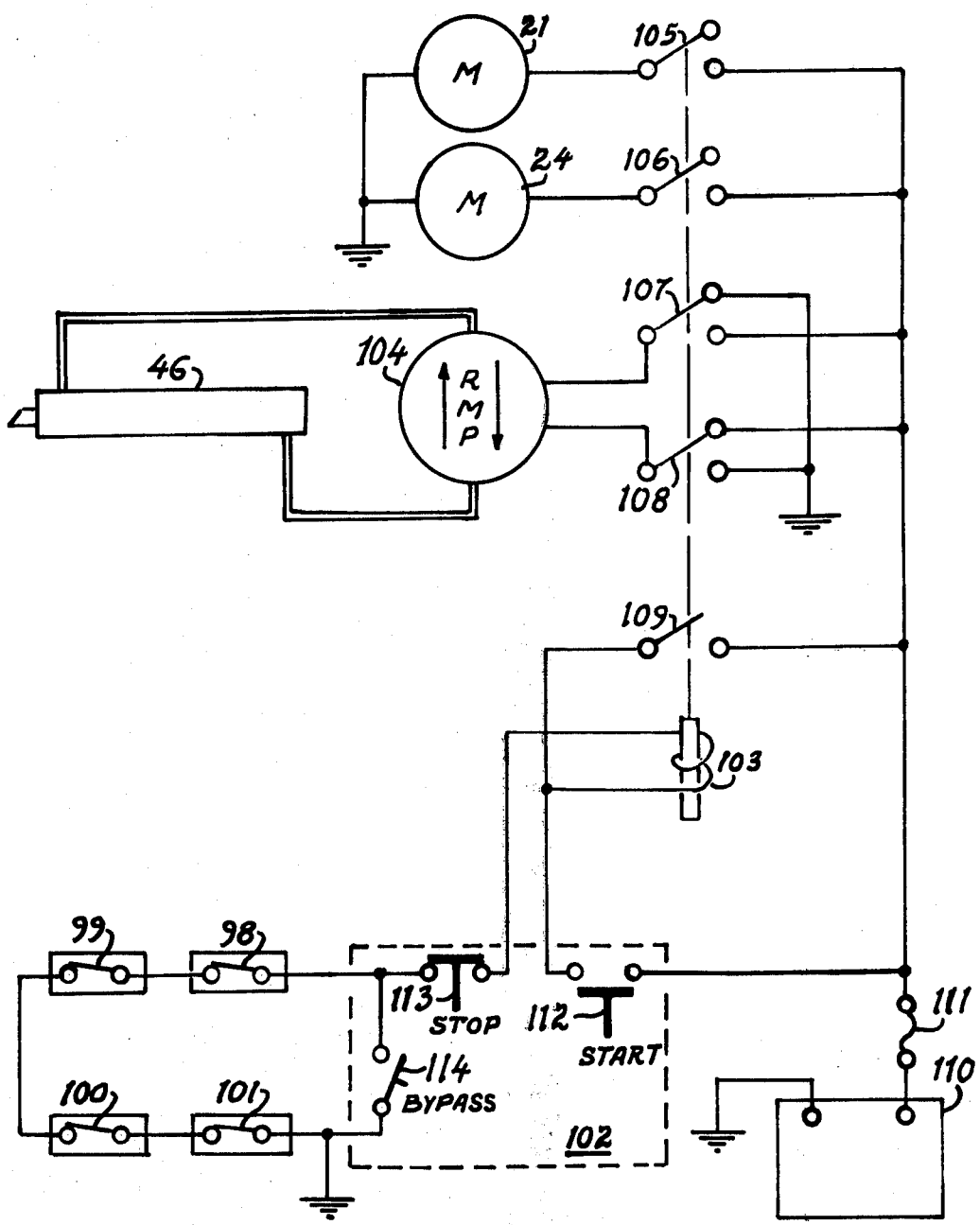
FIG. 15 is a wiring diagram of the electrical control system.

With reference to FIG. 1 and FIG. 2 a helicopter 1 is shown carrying the apparatus which is the subject of the present invention. Other types of aircraft, including fixed wing types, could be used and the present invention could also be adapted to operate from a ground vehicle. The only parts of the apparatus shown in these views are the fluid reservoirs (tanks 2, 3, 4 and 5), the cross-tubes 6 and 7, and the spray pipes 8 and 9 supported by booms 10 and 11.

Referring now to FIG. 3, the principal components of a dual-fluid invert spraying system are diagrammatically shown for ease of understanding.

Outer tanks 2 and 3 normally located on opposite sides of the aircraft 1 are interconnected by cross-tube 6 in order to balance the weight of their contents equally on each side of the aircraft. These larger outer tanks 2 and 3 would normally hold the water phase to which could be added water-soluble active pesticidal or herbicidal ingredients or any other active agrichemical agent.

Respectively located within tanks 2 and 3, smaller inner tanks 4 and 5 are similarly interconnected by cross-tube 7. These inner tanks 4 and 5 would normally hold the oil phase to which could alternately be added oil-soluble active agrichemical agent.

One of the two phases normally carries an effective concentration of emulsifying material that promotes the formation of a water-in-oil emulsion when the aqueous phase is intimately and finely dispersed in the oil phase.

Branching off from the cross-tubes 6 and 7 are two fill pipes 12 and 13 respectively terminated by automatic shutoff couplings 14 and 15.

These shutoff couplings are designed to hermetically and automatically close as soon as they are disconnected from the mating couplings. They are commonly available commercially and are well known to people skilled in the mechanical arts.

The tanks 2, 3, 4 and 5 can be filled by connecting the fill pipe couplings 14 and 15 to compatible equipment at a ground refill station. Vents are provided in the top portion of each tank to exhaust air during filling, readmitting it to equalize atmospheric pressure as the system is used.

Also branching off from the cross-tubes 6 and 7 are two feed pipes sections 16 and 17 leading to a valve assembly 18.

From the valve assembly 18 a single pipe section 19 leads to a centrifugal low speed pump 20 driven by a motor 21.

The pump 20 feeds an inline multiblade rotary mixer 23 through pipe 22. A motor 24 drives the mixer 23. At the output of the mixer 23 a pipe section 25 feeds the two spray pipes 8 and 9. Along the lower side of the spray pipes a plurality of nozzles 26 discharge the invert solution. These nozzles 26 are designed with a pressure sensitive shut-off valve to prevent dripping and assure a clean turn-on and turn-off of the spray.

Fluid level sensors 98, 99, 100 and 101 are located near the bottoms of tanks 2, 3, 4 and 5 respectively. These sensors are of a type commercially available and well known to persons skilled in the electromechanical arts.

Any sensor detecting a low fluid level will generate a switch off signal which is transmitted along a path shown by dotted lines, turning off motors 21 and 24 and activating hydraulic cylinder 46 to prevent further generation and spraying of invert emulsion.

Hydraulic cylinder 46 and motors 21 and 26 can also be controlled by control 102 conveniently located and easily accessible to the operator-pilot.

A pair of concentric tanks 3 and 5 are shown in more detail in FIG. 4 and FIG. 5. As can be seen from the cutaway portion of FIG. 4 and from the cross section of FIG. 5, the inner tank 5 is located in the top center portion of the outer tank 3. This arrangement combines the center of gravity of the two tanks in the same vertical plane and prevents the shifting of the tank's weight forward or backward along the aircraft. Furthermore, since tanks 3 and 5 are connected by cross-tubes 6 and 7 to tanks 2 and 4 on the other side of the aircraft, the weight of the emulsion ingredients is automatically balanced between both sides of the aircraft.

The downward-tapered or funnel shape of tanks 2, 3, 4 and 5 assures a continuous, constant flow of liquids until all tanks are nearly empty.

A dual fluid valve assembly 18 is shown in FIGS. 6 through 10. This valve assembly 18 comprises inlet 31, normally designed to receive the water phase, and inlet 32, normally designed to receive the oil phase; a main valve body 30 having two cylindrical channels 53 and 54; a turn-on/cut-off gate (on-off gate) 34, common to both inlets 31 and 32; a metering gate 35 in the water phase circuit; a metering gate 36 in the oil phase circuit; and a common outlet area 33.

The on-off gate 34 is controlled by plate 50, which can be slid across inlets 31 and 32 to completely and simultaneously obstruct them. The plate 50 is connected to an activating hydraulic cylinder 46 of FIG. 3 by arm 39.

Metering gate 35 is controlled by plate 51 having in its center a hole 37, which can be slid across channel 53. When the hole 37 is in line with channel 53 the maximum flow of the water phase can be obtained through the valve assembly 18.

When plate 51 is slid transversely across channel 53, the aperture formed by the hole 37 and channel 53 is progressively reduced.

A threaded arm 40 connected to plate 51 protrudes through one side of the valve assembly and engages a threaded thumbwheel 42. A flanged section 55 of the thumbwheel 42 is captured by bracket plate 48 secured to the side of the valve main body 30 by screws 49.

Metering gate 36 is similarly controlled by plate 52, having a hole 38, located across channel 54 and connected to arm 41 engaging thumbwheel 43.

Turning thumbwheels 42 and 43 causes plates 51 and 52 respectively to move transversely across channels 53 and 54 modifying their respective metering gate apertures.

Small handles 44 and 45 are pressed into thumbwheels 42 and 43 for ease of operation.

Threaded arms 40 and 41 may be marked with graduations corresponding to predetermined aperture settings to facilitate preflight adjustments of dosages of the various fluids.

The mixing chamber assembly is shown in FIGS. 11 and 12.

The mixer 23 comprises a cylindrical elongated body 60 closed at each end by rectangular elements 63 and 64. An inlet 61 and an outlet 62 respectively are located on the side and toward each end of the cylindrical body 60.

Two parallel shafts 65 and 66 are mounted within the cylindrical body 60 between elements 63 and 64. On each shaft 65 and 66 a plurality of twisted-blade agitators 69 are spaced along said shafts in an interleaved pattern.

Shafts 65 and 66 protrude through end element 64, and are intercoupled by gears 67 and 68.

Shaft 65 is directly connected to the drive shaft of an electrical motor 24.

A typical suspension-bracket assembly used to attach parts of the apparatus to the aircraft frame is shown in FIGS. 13 and 14.

In the example shown the suspension assembly 80 is used to secure the cross-tube 6 of a section 90 of the aircraft structure.

Cross-tube 6 runs parallel to post 90, which forms part of the aircraft 1 structure.

The suspension assembly 80 comprises:
- a T-shaped element 81 secured to post 90 by two screw-band clamps 87 and 88; and
- a T-shaped element 84 secured to cross-tube 6 by two screw-band clamps 89 and 70.

The two T-shaped elements 81 and 82 are fastened through their bases 93 and 94 by nut and bolt assembly 85.

Washer-type spacers 86 can be inserted between the T-shaped elements 81 and 82 to obtain the desired spacing between post 90 and cross-tube 6.

The cross sections 83 and 84 of the two T-shaped elements 81 and 82 are manufactured from sections of pipes cut to form a 45° arc-shaped gutter.

The central sections 91 and 92 of T-shaped elements 81 and 82 are manufactured from full sections of pipe closed at their bases 93 and 94. At the center of the bases 93 and 94 a hole accepts nut and bolt assembly 85.

Openings 95 and 96 in the centers of cross sections 83 and 84 provide access to the insides of central sections 91 and 92 for inserting, adjusting and tightening nut and bolt assembly 85.

Elements 81 and 82 can be adjusted to set cross section 84 at varying angles with respect to cross-section 83.

Spacers 86 may be made of elastic material to create a shock absorbing and/or flexible link between elements 81 and 82.

The electrical control system is shown in FIG. 15.

The operator control 112 comprises a start push-button 112 and a stop push-button 113 conveniently located in an area easily accessible to the pilot-operator during flight.

A latching solenoid 103 controlled by start and stop push-buttons 112 and 113 drives a series of switches 105, 106, 107 and 108. These switches control operation of pump motor 21, mixer motor 24, and reversible motor-pump assembly 104 which drives hydraulic cylinder 46.

A series of four sensor-switches 98, 99, 100 and 101 are activated by the fluid levels in tanks 2, 3, 4 and 5. The power source 110 is provided by the aircraft batteries and protected by circuit-breaker 111.

The sensor-switches 98, 99, 100 and 101 are of a type commercially available and well known to persons skilled in the electromechanical arts. These switches are designed to provide a closed contact as long as the presence of fluid is detected. The contacts open as soon as the fluid level falls below the location of the sensor. Miscellaneous stop and safety switches associated with the operation of reversible motor pump 104 are not shown in the diagram.

SYSTEM OPERATION

Tank loading and metering valve adjustments are performed on the ground prior to take-off.

With motors 21 and 24 turned off, and on-off gate 34 closed, the various tanks 2, 3, 4 and 5 are filled by connecting fill pipes 12 and 13 to convenient sources of oil-phase and water-phase fluids, which may also include active pesticide and/or herbicide solutions.

The metering valves 35 and 36 are then adjusted to a predetermined setting. If necessary motors 21 and 24 may be started and on/off gate 34 momentarily opened to check for proper consistency of the invert emulsion emitted by spray nozzles 26.

It will usually be unnecessary to readjust the metering valves after a subsequent refilling unless new types of fluids are to be used or a different consistency of emulsion is desired.

The system is now ready for take off. Due to the funnel-like shape of tanks 2, 3, 4 and 5 and the concentric mounting of inner tanks 4 and 5 within tanks 2 and 3 the center of gravity of each pair of concentric tanks remains in the same vertical plane while the tanks are being emptied. This improves aircraft maneuverability by preventing shifting of the load forward and backward along the central axis of the aircraft. Furthermore, the cross-feed through pipe 6 between outer tanks 2 and 3, through pipe 7 between inner tanks 4 and 5 guarantees that the tanks' loads will always be distributed equally between sides of the aircraft.

It is, therefore, possible by carefully positioning the tanks to situate and to keep the center of gravity of the combined load on a vertical plane extending downward from the center of the wing and the main engine shaft.

The funnel shape of tanks 2, 3, 4 and 5 and their concentric arrangement also minimizes splashing of the liquids within the tanks and prevents momentary reduction or interruption of liquid flow through cross-tubes 6 and 7. A continuous and uniform flow of fluid is thus assured throughout the spraying operation until one of the tanks is completely emptied.

Once in the air, and at the proper altitude over the area to be sprayed, the operator-pilot, by means of combined control 102, energizes motors 21 and 24 and simultaneously activates hydraulic cylinder 46 to open on-off gate 34.

When the start push-button 112 on combined control 102 is pressed solenoid 103 is energized, assuming that sensor-switches 98, 99, 100 and 101 are all closed, a condition indicating that none of the tanks is empty. If the system must be operated while one or more of the tanks is empty the BYPASS switch 114 must be closed.

Solenoid 103 will be kept energized by latching switch 109 until stop push-button 113 is pressed or one of the sensor-switches open.

As long as solenoid 103 is energized motor 21 is powered through switch 105, motor 24 is powered through switch 106 and reversible motor pump 104 is activated through switches 107 and 108, causing withdrawal of hydraulic cylinder 46 until on-off gate 34 is fully open.

When solenoid 103 is de-energized motors 21 and 24 are stopped and reversible motor-pump 104 is activated causing outward motion of hydraulic cylinder 46 until on-off gate 34 is fully closed.

The water phase separately dosed through gate 51 flows from inlet 31 to the outlet area 33. Similarly, the oil phase separately dosed through gate 52 flows from inlet 32 to the outlet area 33 where it combines with the water phase to form a premix, which is drawn by the pump 20 and forced into the mixer 23.

A low speed centrifugal pump running at the rate of 3,500 R.P.M. has been found to be adequate to feed the two-inch diameter pipe 22 leading to mixer 23.

In mixer 23 shafts 65 and 66 can be driven at the relatively low speed of 2,000 R.P.M. and produce sufficient stirring of the premix to cause the formation of an emulsion.

The emulsion is forced through mixer 23 into pipe 25, and from there to spray pipes 8 and 9 by hydrostatic pressure from pump 20.

The spray nozzles 26 have built-in pressure-sensitive valves, which will open only when the pressure in the spray pipes 8 and 9 reaches a certain level, and will automatically shut off when the pressure falls below that same level. This prevents dripping of the emulsion during the start-up or cut-off.

As soon as any one of tanks 2, 3, 4 or 5 is nearly empty corresponding sensor 98, 99, 100 or 101 sends a signal to shut off motors 21 and 24, and to activate cylinder 46 to close on-off gate 34.

Alternatively, the pilot operator can use a combined control to shut off the operation.

The tank can be refilled and/or the system restarted without the need for readjusting the metering valves.

The valve assembly 18, pump 20, and mixer 23, and various conduits can be made of light, corrosion-resistant material.

This, combined with simplicity and a minimal number of components, contributes to providing a light weight system ideally suited for airborne use since it has minimum effect on the maneuverability and weight of the aircraft.

I claim:

1. In combination with an aircraft, an apparatus for continuous formation and spraying of an invert emulsion from at least one water phase and at least one oil phase, wherein at least one of said phases contains an active agrochemical agent, which comprises:

at least two concentric, vented, funnel-shaped tanks on one side of the aircraft;

at least two similar funnel-shaped tanks on the other side of the aircraft;

an outlet on the bottom of each tank;

a cross-tube connecting each outlet to the outlet of the similar tank at the opposite side of the aircraft each pair of interconnected tanks holding one of said phase;

a filling pipe connected to each cross-tube;

one multifluid valve assembly for co-mingling said phases into a premix comprising:
- at least two inlets each leading to a channel controled by a common on-off gate formed by a plate sliding across said channels to completely close them,
- a separate metering gate across each said channel formed by a plate having a hole in its center, sliding across said channel to partially close it, and
- a common outlet area connected to all said channels;

conduit means, for delivering each one of said phases to said valve assembly, branching off each cross-tube, each leading to one of the inlets of said valve assembly;

a single low speed pump means;

a mechanical stirring means for turning said premix into an invert emulsion comprising:
- a chamber having an inlet and an outlet, and a plurality of rotary agitators mounted within said chamber;

at least one spray-forming means;

conduit means for delivering said premix to said pump means and from said pump means to said mechanical stirring means; and conduit means for delivering said invert emulsion to said spray forming means.

2. An apparatus according to claim 1 which comprises motor means to drive said pump means and said rotary agitators;

a hydraulic cylinder means to control the on-off gate;

a sensor means mounted near the bottom of each tank for detecting low fluid level; electromechanical means to simultaneously activate said motor means and open said on-off gate under operator command; and electromechanical means to switch off said motor means, and to close said on-off gate under operator's command, and upon low fluid level detection.

3. An apparatus according to claim 2 wherein parts of said apparatus are attached to the aircraft frame by adjustable suspension-bracket assemblies wherein each assembly comprises:
- two T-shaped elements each having a gutter-shaped cross section and a cylindrical central section closed at the base;
- a plurality of spacers;
- a nut and bolt assembly running through the bases of said cental sections and through said spacers;
- two pairs of screw-band clamps securing the cross sections of the T-shaped elements, one to the aircraft frame the other to a part of said apparatus.

4. An apparatus according to claim 3 wherein said spraying means comprise a plurality of spray nozzles mounted along a pipe, and in the outlet of each spray nozzle a pressure sensitive valve.

5. An apparatus according to claim 4, wherein each said filling pipe comprises a shutoff coupling;

said multifluid valve assembly comprises:
- a threaded arm connected to the plate of each metering gate;
- engaged by said arm a threaded thumbwheel secured to the side of the valve assembly for manually adjusting said metering gate;
- said rotary agitators comprise two parallel shafts mounted within said chamber;
- on each shaft a plurality of twisted blades, spaced along said shaft, in an interleaved pattern;
- a set of gears outside the chamber, coupling said shafts together and means for connecting one of the shafts to said motor means; and said electromechanical means comprises:
- an electrical power source;
- a plurality of solenoid driven switches simultaneously controlling the operation of said motor means and the operation of said hydraulic cylinder means;
- a latching solenoid driving said switches;
- operator control means to energize and de-energize said solenoid; and switch means to de-energize said solenoid upon low fluid level detection by any one of said sensors.

* * * * *